United States Patent
Teutsch

(12) 
(10) Patent No.: US 6,309,200 B1
(45) Date of Patent: Oct. 30, 2001

(54) APPARATUS FOR TEXTURING A THERMOPLASTIC EXTRUSION UTILIZING A LIQUID JET PRINTER HEAD

(75) Inventor: Erich Otto Teutsch, Richmond, MA (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/143,008

(22) Filed: Aug. 28, 1998

(51) Int. Cl.[7] .................................................. B29C 47/88
(52) U.S. Cl. ........................ 425/104; 425/325; 425/378.1; 425/385
(58) Field of Search ..................................... 425/325, 380, 425/DIG. 9, 385, 104, 378.1; 264/177.19, 211.13

(56) References Cited

U.S. PATENT DOCUMENTS

| | | | |
|---|---|---|---|
| 4,031,946 | * 6/1977 | Marti et al. ............................. | 164/89 |
| 4,171,193 | * 10/1979 | Rahlfs ..................................... | 425/71 |
| 4,671,913 | 6/1987 | Gen et al. ............................. | 264/171 |
| 4,906,170 | 3/1990 | Nelson et al. ......................... | 425/94 |
| 5,059,104 | * 10/1991 | Alberto ................................ | 425/72.2 |
| 5,164,227 | 11/1992 | Miekka et al. ........................ | 427/162 |
| 5,184,152 | 2/1993 | French .................................... | 346/76 |
| 5,223,852 | 6/1993 | Oresti et al. ........................... | 346/1.1 |
| 5,531,951 | * 7/1996 | Travelute et al. ..................... | 264/143 |
| 5,665,278 | * 9/1997 | Allen et al. .............................. | 264/6 |
| 5,948,332 | * 9/1999 | Prenger ............................... | 264/40.5 |

FOREIGN PATENT DOCUMENTS

| | | |
|---|---|---|
| 27 17 357 A | 12/1978 | (DE) . |
| 58 012742 A | 1/1983 | (JP) . |

* cited by examiner

*Primary Examiner*—Nam Nguyen
*Assistant Examiner*—Emmanuel Luk

(57) ABSTRACT

In an apparatus for texturing an outer surface of an extruded thermoplastic resin article, thermoplastic resin article is formed from a molten thermoplastic resin and a liquid jet printer head is adapted to impinge a stream of liquid against said thermoplastic resin for rapidly cooling said thermoplastic resin in impinged area to imparting texturing to said extruded thermoplastic resin article.

8 Claims, 1 Drawing Sheet

APPARATUS FOR TEXTURING A THERMOPLASTIC EXTRUSION UTILIZING A LIQUID JET PRINTER HEAD

FIELD OF INVENTION

The present invention relates to an apparatus for texturing an extruded thermoplastic material.

BACKGROUND OF THE INVENTION

Texturing the surface of plastic extrusions is often difficult and may interfere with the extrusion process. Typically, texturing is performed as a separate process step after the extrusion step.

U.S. Pat. No. 4,671,913 to Gen et al. describes feeding an extruded sheet through cold press rolls followed by guide rolls, and then through embossing rolls.

U.S. Pat.No. 5,164,227 to Miekka describes a method for decoration of a paper or plastic sheeting where the coated sheet is heated to soften the coating and then decorated using embossing rollers to decorate the sheet. A remote heat source softens the sheet before embossing. The surface of the embossing roller is hard and distorts the sheet.

For many extrusions, especially hollow extrusions, textured wheels tend to deform the surface and distort the profile itself. The profile requires support from the underside to resist the force of the wheels. Typically, the texturing wheel also has to provide sufficient cooling to the plastic surface so that the pattern is not diminished by subsequent operations such as calibrating. Texturing wheels or rollers also have an undesirable short repeat pattern which tends to be aesthetically objectionable. Use of rollers also requires that the surface speeds of the roller matches the surface speed of the extrudate so as to further complicate the mechanism.

U.S. Pat. Nos. 4,906,170 to Nelson et al and 5,184,152 to French describe an apparatus for printing, but not texturing, on plastic tubing which might be drawn from an extruder.

Hence, it desirable to provide for an improved apparatus and process for texturing a continuous extrusion with an extended or random pattern without applying undue pressure to the surface of the extrusion.

SUMMARY OF THE INVENTION

It is desirable to overcome one or more disadvantages of prior art texturing devices by providing an apparatus for extended surface texturing which has the ability to obtain an infinite variability in surface texture of a design. Additionally, desirable features include the ability for immediate changeover from one texture design to the next without mechanical changes, and which provides no lost time during changeover due to installation. Also, with the present invention, re-heating the extrusion or attaining steady state is not normally necessary. The present invention is desirable characterized by the absence of a texture roll and no mechanical contact. Reduced precision is needed in the marking system to profile distance while there is a minimal effect on die to calibrator distance.

Another object of the present invention is to provide an apparatus for continuously applying surface texturing to a lineal type extrusion without distorting the extruded article.

In accordance with the present invention, there is provided an apparatus for texturing an outer surface of a thermoplastic resin article comprising a means for forming a thermoplastic resin article from a molten thermoplastic resin and a non-contact liquid jet printer head for impinging a stream of liquid against said thermoplastic resin for rapidly cooling said thermoplastic resin in an impinged area for imparting texturing to said extruded thermoplastic resin article. Preferably, the stream of liquid is in the form of droplets that originate from liquid printer head.

DESCRIPTION OF THE PREFERRED EMBODIMENT

It is contemplated that the present invention may be used in conjunction with a variety of articles formed from a molten resin. The articles may be formed by such techniques as extrusion. Extrusion includes profile, blow molding, blown film and cast film. In profile extrusion, a profile of a predetermined shape is extruded. The profile may have hollow portions. In blown film, a pairson is formed, cooled and collapsed to form a film. Prior to cooling and collapsing, the film may be patterned. In the cast film technique, an extruded film is cast onto a moving surface. The cast film may be marked according to the present invention prior to solidification and cooling of the film. It is not necessary to utilize a mold with the present invention since the technique is essentially non-contact. A pairson may be formed and textured.

The actual marking can be in a pattern. It is considered that a random pattern or even a non-pattern is a pattern. The markings may be manufacturing data such as time, date, shift. Decorative effects include wood grain, leather grain of the like which are in a repetitive pattern. Company logos, even written disclaimers, or other information may be included as marking according to the present invention.

Figure 1:
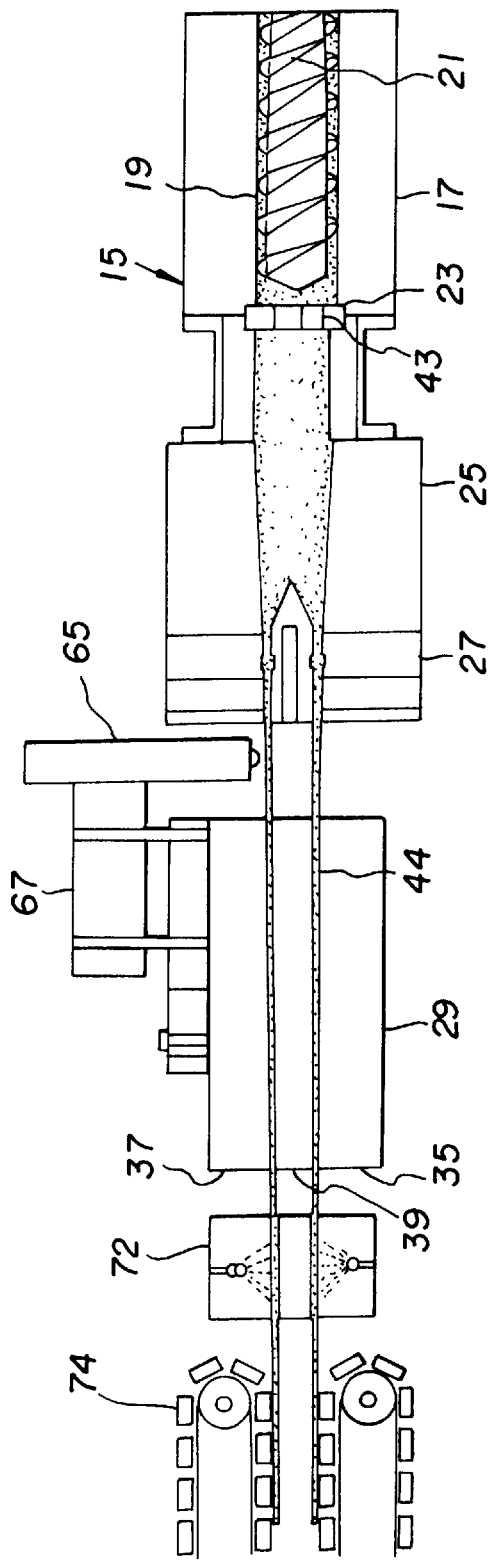
FIG. 1 is a schematic of the apparatus of the present invention showing an extruder, calibrator and carrier for the printer head for the textured material.

FIG. 1 shows an extrusion molding machine or extruder at 15. The extruder 15 has a housing 17 with a central barrel shape opening 19 with a helical screw 21 mounted for rotation about an axis. At one end of the opening, a hopper (not shown) is utilized for feeding material to be extruded into the rear portion of the screw 21. Helical threads mounted on the screw 21 are positioned for moving material from the rear portion of the screw to a forward portion through the opening 19. As the material or feedstock is conveyed along the screw 21, it is heated by frictional forces caused by rotation of the screw 21. It is also contemplated that an external heating source such as an electrical resistant heater may be provided to heat the extruder 15 which in turn heats the feedstock. The barrel or housing 17 or the screw 21 are parts of the extruder which may heated.

At the forward end of the housing 17 and spaced from the forward end of the screw 21, a gate or breaker plate 23 may be mounted transverse to the flow of feedstock. The gate 23, which includes a plurality of openings 43 for the passage of feedstock, acts to create a back pressure which contributes to the mixing and heating of the feedstock and also serves to filter impurities from the feedstock.

A die body 25 which is mounted on the forward end of the housing 17. The mounting is conventionally made by bolting or clamping a flange on the die body 25 to a flange on the housing 17. As illustrated in FIG. 1, the die body 25 includes a tapered central and axially aligned opening which throttles the feedstock. At the a die outlet a die plate 27 has an opening with the desired cross sectional shape of the lineal profile to be extruded.

It is also contemplated one or more layers may be coextruded or added at the end of the die 27. In coextrusion, additional extrudes may be provided for the additional layers. Another technique for adding a layer at the end of the die 27 is to include a capping plate which has an opening for the passage of capping layer. In this case, the outer layer may be of a weatherable material so as to resist the effects of UV radiation and moisture. Typically pressures within the extruder are in excess of 2,000 lbs/sq. inch, and is preferably from 2,000 to 5,000.lbs/sq. inch.

In accordance with the present invention, a liquid printer head 65 is mounted on a frame 67 adjacent but in non-contact relationship to the molded article for texturing article prior to cooling. As shown, in the drawing, the printer head 65 is provided directly in the path of the melted thermoplastic material exiting the extruder 15 so that melted flowing material is impinged with a stream of droplets from the printer head 65 prior to being fed into the calibrator 29 and prior to completion of the cooling.

Figure 3:
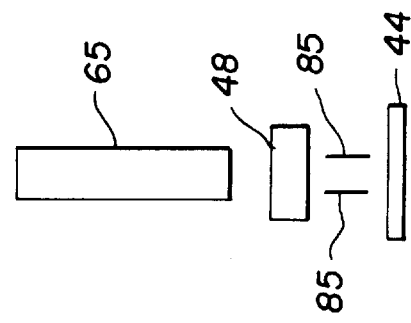
FIG. 3 illustrates the printer head in relation to the phase detector and deflector plates.

The printer head 65 may be a printer head as commonly used and as described in U.S. Pat. No. 4,906,170 previously mentioned. The details of the printer head are incorporated into the present application by reference to the specification. The printer head comprises the gun body, which is supplied with ink through a line. The gun body thus produces a liquid jet, which is comprised of multitude of tiny droplets of liquid, which are in turn supplied to a charge electrode and phase detector 48. (See FIG. 3) The charge electrode and phase detector 48 is supplied with a charge electrode signal from a control unit to give each droplet of liquid a specific charge according to the pattern to be printed. The liquid jet is then supplied to deflector plates 85 comprising a positive and negatively charged plate, which act to separate the individually charged ink droplets according to the charge electrode signal. This produces phasing drops, which strike and impinge against the hot surface of the molded article.

In the present invention, it is preferable to use water instead of ink. In the present invention, the cooling effect of the liquid provides the desired texturing. The surface of the extrusion which is typically just above its melting temperature is quickly cooled in the impinged area. This leads to a raised or depressed area in the cooled area which is visible. The cooling or heat loss is effected through a phase change of the fluid, typically water, from a liquid to a gaseous state. When the impinging stream is in the form of droplets, the localized cooling of a droplet results in a localized solidification which resist stretching so as to form a mark. Stretching is pronounced in the area immediately after extrusion and prior to cooling. Once the extrusion is cooled as occurs in the calibrator 29, the stretching is limited. After marking by impinging a liquid and stretching, it is desirable to minimize the re-heating of the resin. Since resin is typically not thermally conductive, areas of the resin not impinged retain a latent heat which can reheat the impinged and solidified areas so as to remove any marking.

A suitable support structure for use in the present invention may be of the type described in FIG. 4 of the above patent. The print head may be supported by a bracket to beam connection which is in turn connected to a first support block which is mounted for controlled movement along an x direction. The first support block is in turn mounted to a second support block which is in turn movable along y direction which is perpendicular to the x direction. Due to this mounting arrangement, the printer head is mounted for movement in any direction in a plane parallel to the surface of the article being textured. Additional mountings are contemplated to impart movement in a z direction.

According to an actual specific example, as performed in accordance with the present invention, a printer was purchased and the printer head was dis-assembled from the printer and mounted on a frame adjacent the extruder. Either ink jet type or bubble jet printers may be used.

The vacuum calibrator 29 includes opposed and spaced apart sections 35, 37 for defining a gap 39 therebetween. The gap 39 is determinative of a dimension of the final article. Each of the opposing sections 35, 37 include respective conformal surfaces which have a plurality of openings to draw the extrusion into contact with the surfaces which form the gap. The section 35, 37 of the calibrator 29 is in the form of a closed container having perforations 51 facing the extrusion 44. The respective container section 35 or 37, is connected to a source of reduced pressure (not shown) so that an area of reduced pressure draws the extrusion 44 into contact with the calibrator 29. The calibrator 29 servers to cool and shape the extrusion. The conforming surfaces of the calibrator 29 may have a variety of complex shapes.

A cooling section 72 includes a spray tank for cooling the extrusion. The additional cooling provided by the cooling section 72 removes additional heat from the extruded article. A puller is illustrated at 74 and includes a pair of opposing tractor type belt mechanisms which grip the extrusion to pull the extrusion. The puller 74 crates a stretching action as the melted article exits the extruder 17.

Figure 2:
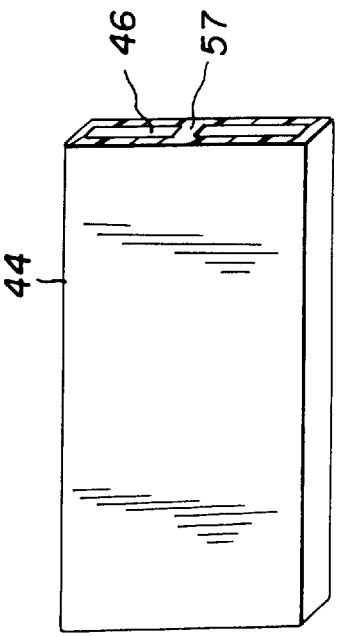
FIG. 2 illustrates the profile of a hollow sheet having a pattern.

Reference number 44 refers to the extruded article which is shown as a hollow profile sheet 44. The profile of the hollow sheet 44 is illustrated in FIG. 2. Other cross sections for an extrusion are contemplated for such as T, U and C cross sectional shapes. Uses for such lineal extrusions include window and door frames, supports, and other framing material. The die plate 27 has a configuration permitting the formation of elongated hollow sections 46 as part of the sheet 44.

The extruded articles may have a variety of cross sectional shapes depending on the use. FIG. 2 illustrates a cross section of lineal extruded structure having centrally extending wall portion 57 in the form of a perpendicularly extending flange. The lineal profile illustrated includes one wall portion intersecting to form a hollow cross sectional profile. It is contemplated that the cross-section can comprise curved sections. The lineal structure is desirably utilized as a frame for an opening in a building. Channel type structures may be utilized to hold stationary or moveable panels, as for example, a window pane or door. The calibrator 29 and the die body 25 are configured to prepare extrusions having various shapes.

The thermoplastic materials that can be employed in profile structure should be suitable for the geographical region in which the profile, when converted into a building product, would be used or depending upon the building code for the region. Typical thermoplastic materials are high temperature thermoplastics such as acrylonitrile-butadiene-styrene (ABS), polycarbonate, polycarbonate/ ABS blend, a co-polycarbonate-polyester, acrylic-styrene-acrylonitrile (ASA), acrylonitrile-(ethylene-propylene diamine modified)-styrene (AES), polyalkylene terephthalate such as polybutylene terephthalate (PBT) or polyethylene terephthalate (PET) or blends thereof, blends of polyphenylene ether/ polyamide (NORYL GTX Registered TM from General Electric Company), blends of polycarbonate/ polybutylene terephthalate and impact modifier (XENOY Registered TM resin from General Electric Company), blends of polycarbonate/PBT/PET, etc., or blends thereof with other additives such as fillers, impact modifiers, pigments, stabilizer, reinforcing agents, etc. It is contemplated that PVC can also be use.

Polyamides useful in the present invention are well-known in the art. Specific examples of polyamides are polyamide-6, polyamide-6,6, polyamide-11, polyamide-12, polyamide-6,3, polyamide-6,4, polyamide-6,10 and polyamide-6,12, as well as polyamides prepared from terephthalic acid and/or isophthalic acid and trimethylhexamethylenediamine; from adipic acid and m-xylylenediamines; from adipic acid, azelaic acid 2,2-bis-(p-aminocyclohexyl) propane, and from terephthalic acid and 4,4' diaminodicyclohexylmethane.

Other materials include polyethylene (HDPE, LLDPE, etc.) as well as other low temperature materials such as polypropylene and vinyl type polymers. These lower melting polymers are often used for blown or cast forming processes.

The rapid cooling of the melt results in the cooled portion resisting change due to stretching. To create areas that resist this change, it is preferred to apply a liquid which undergoes a phase change at the processing temperature so as to affect the localized viscosity of the melt. The application of the liquid droplets is preferably performed by a non-contact ink jet or bubble jet apparatus but also may be performed by applying phase change fluid, such as by bubbles, by moving needles with or without contact of the needle and the molten plastic.

Contacting a surface layer with a pattern may tend to thin a cap layer by disturbing the layer. Thinning the layer may affect the weatherability of the layer.

Mixtures and/or copolymers of two or more of the foregoing discussed polymers or prepolymers thereof, respectively, are also within the scope of the present invention.

What is claimed is:

1. An apparatus for marking an outer surface of a thermoplastic resin article comprising (a) means for extruding a molten thermoplastic resin article (b) a non contact liquid jet printer head, having associated therewith electronically charged deflector plates which said printer head produces a multitude of droplets of liquid, for impinging a stream of said liquid droplets against said outer surface of the molten thermoplastic resin article thereby resulting in localized cooling and solidification to impart a raised mark on said molten thermoplastic resin surface in an impinged area and (c) means for subsequent cooling of the thermoplastic resin article.

2. An apparatus for marking an outer surface of an extruded thermoplastic resin article according to claim 1 wherein said printer head is spaced from the surface of said extruded article.

3. An apparatus for marking an outer surface of an extruded thermoplastic resin article according to claim 1 wherein said means for extruding said molten thermoplastic resin article comprises an extruder, said extruder including a housing having an opening, a screw positioned in said opening, a die for forming said formable thermoplastic resin into a desired shape prior to feeding to a calibrator.

4. An apparatus for marking an outer surface of an extruded thermoplastic resin article according to claim 3 wherein said die forms a lineal extrusion having an interior hollow portion.

5. An apparatus for marking an outer surface of an extruded thermoplastic resin article according to claim 3 wherein said printer head comprises a gun body for producing a liquid jet comprising drops, a charge electrode for charging liquid drops, a means for deflecting liquid drops to produce a pattern.

6. An apparatus for marking an outer surface of an extruded thermoplastic resin article according to claim 1 wherein said liquid jet printer head is mounted for movement for creating a two dimensional pattern.

7. An apparatus for marking an outer surface of an extruded thermoplastic resin article according to claim 6 wherein said impinging liquid droplet rapidly cools said formed resin.

8. An apparatus for marking an outer surface of an extruded thermoplastic resin article according to claim 1 wherein a textured area of said extruded thermoplastic resin article is comprised of rapidly solidified areas.

* * * * *